(12) United States Patent
Poll et al.

(10) Patent No.: US 7,345,676 B2
(45) Date of Patent: Mar. 18, 2008

(54) TEXT ENTRY FOR ELECTRONIC DEVICE

(75) Inventors: Leonard H. Poll, Redhill (GB); David C. Yule, Taipei (TW)

(73) Assignee: Koninklijke Philips Electrnics N.V., Eindhoven (NL)

( * ) Notice: Subject to any disclaimer, the term of this patent is extended or adjusted under 35 U.S.C. 154(b) by 448 days.

(21) Appl. No.: 10/516,894

(22) PCT Filed: Jun. 4, 2003

(86) PCT No.: PCT/IB03/02582

§ 371 (c)(1),
(2), (4) Date: Dec. 3, 2004

(87) PCT Pub. No.: WO03/104913

PCT Pub. Date: Dec. 18, 2003

(65) Prior Publication Data

US 2005/0219232 A1 Oct. 6, 2005

(30) Foreign Application Priority Data

Jun. 8, 2002 (GB) .................................. 0213219.9

(51) Int. Cl.
*G09G 5/00* (2006.01)
(52) U.S. Cl. ...................... 345/173; 345/174; 345/175; 178/18.01; 178/18.03; 178/18.05; 178/18.09
(58) Field of Classification Search ................. 345/173, 345/174, 175; 178/18.01, 18.03, 18.09, 19.05
See application file for complete search history.

(56) References Cited

U.S. PATENT DOCUMENTS

| 5,631,741 | A  | * | 5/1997 | Matthews ................... 358/296 |
| 6,867,765 | B2 | * | 3/2005 | LeKuch et al. ............. 345/173 |
| 7,103,848 | B2 | * | 9/2006 | Barsness et al. ............ 715/776 |
| 2003/0169289 | A1 | * | 9/2003 | Holt et al. .................. 345/735 |

* cited by examiner

*Primary Examiner*—Richard Hjerpe
*Assistant Examiner*—Leonid Shapiro

(57) ABSTRACT

An electronic device has a touch sensitive surface (14) for entering text. The text is stored in memory (20) in a vector graphics format, preferably without carrying out character recognition.

8 Claims, 2 Drawing Sheets

TEXT ENTRY FOR ELECTRONIC DEVICE

The invention relates to text entry on an electronic device, particularly a mobile device, for example a mobile telephone or a personal digital assistant (PDA).

A large number of different methods for inputting text are currently used for electronic apparatus: using a numeric keypad, using a plug-in keyboard, character recognition using a touch screen and a virtual keyboard on a touch screen.

Text entry is an important feature of electronic devices, including mobile devices such as mobile telephones and PDA's, since the number of text messages being sent has increased remarkably over the past years. It is difficult to enter text using a conventional telephone keypad, and the difficulty increases enormously when the text needs to be entered in languages using a large number of characters, such as Japanese or Chinese.

Pen based text entry methods have been in common use on devices such as PDA's for some time. Text is manually entered and recognised by handwriting recognition software. Unfortunately, this approach is far from ideal. Handwriting recognition software is prone to errors, and often requires user training. Further, some handwriting software requires the user to adjust the way in which characters are entered. Handwriting recognition software is both script and language specific, and requires a fair amount of processing power that may not be available on mobile telephone devices. Further, any combination of graphics and text is very hard to deal with using this approach.

The use of a touch screen in combination with a pen allows the user to enter graphics directly. These graphics can contain handwritten text that may be sent to another mobile device. An example of such a device is disclosed in GB 2308523.

Unfortunately, this approach is still not suitable for a flexible text messaging system because the graphics file size is large compared to text alone and requires a significant amount of bandwidth. Further, pure graphics may not be effectively resealed or organised to support the exchange of text messages between devices with different screen characteristics. Thus, although this approach may be suitable for sending graphics messages, it is not suitable for sending text messages.

According to the invention, there is provided an electronic device having a touch sensitive surface for inputting strokes forming at least one character; a memory; and code for interpreting inputted strokes and storing the strokes in the memory in a vector graphics format.

This system accordingly allows characters, especially text, to be entered and stored in a vector graphics format. As compared with bitmap graphics, vector graphics require vastly reduced storage requirements. The reduced storage requirements correspond to greatly reduced bandwidth requirements for exchanging entered text between devices.

Further, the use of vector graphics allows flexibility which permits the reproduction of characters entered on very different sizes and types of displays.

The electronic device is preferably a mobile device. As will be appreciated, some mobile devices have very small, low resolution displays whereas others have large high quality displays and it is useful to be able to exchange text messages between mobile devices with different types of displays.

A further significant benefit is that there is no need for character recognition software. This makes the invention highly suitable for script independent messaging systems and for the use of engineering language.

By storing entered text as vector graphics the stored text can be used as a basis for text recognition at a later stage either in the input device or an external device.

The system offers the further benefit that displaying text written by the user makes the message much more personalised.

Further, it is very easy to combine text and graphics in a single message.

Preferably, the mobile device further comprises code for causing the mobile device to combine the strokes representing a plurality of characters and to transmit the message over a mobile network.

Preferably, the vector graphics format is the scaleable vector graphics format as published by the W3C Organisation. The scaleable vector graphics format used may be one of the scaler vector graphics implementation suitable for mobile communications, known as SVG basic and SVG tiny, or the general scaler vector graphics format. As will be appreciated, other vector graphics formats may also be used.

Preferably, the mobile device does not carry out any character recognition on the/or each character entered.

In another aspect, the invention relates to an input method for a mobile device, including: accepting on a touch sensitive surface at least one stroke forming at least one character; encoding the strokes entered in a vector graphics format; storing the encoded strokes.

The invention also relates to a computer program product containing code for causing a mobile device to carry out the steps of this method. The computer program product may be recorded on a data carrier, e.g. memory in the mobile device.

For a better understanding of the invention, an embodiment will now be described, purely by way of example, with reference to the accompanying drawings in which.

Figure 1:
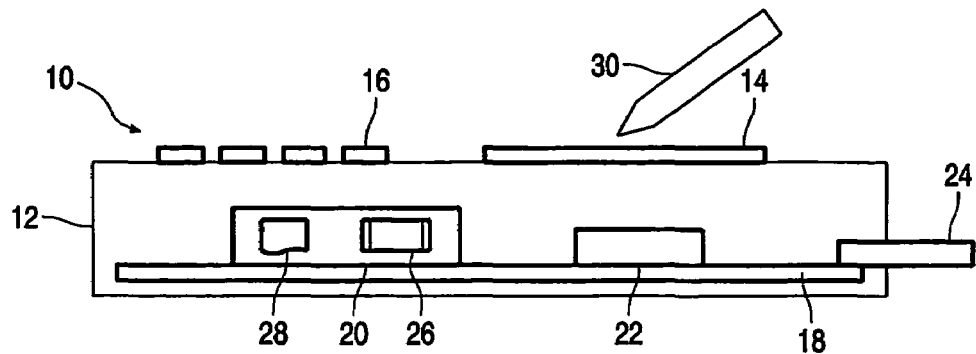
FIG. 1 shows a mobile device according to an embodiment of the invention.

A mobile device 10 has a housing 12 supporting a touch screen 14 and a small keypad 16. The housing 12 contains a printed circuit board 18 populated with a memory 20 and a processor 22. An aerial 24 is connected to the printed circuit board 18 to transmit signals. The skilled person will be aware of many different ways of implementing such a mobile telephone, and in particular a large number of different types of aerial, printed circuit board, processor, memory and keypad are available. Likewise, the skilled person will be aware of suitable touch screens, so these will not be described further.

The memory 20 contains code 26 for causing the processor 22 to control the mobile telephone 10 to carry out the steps of a method as will be described below. The memory 20 may also contain data items 28 corresponding to entered characters.

Figure 2:
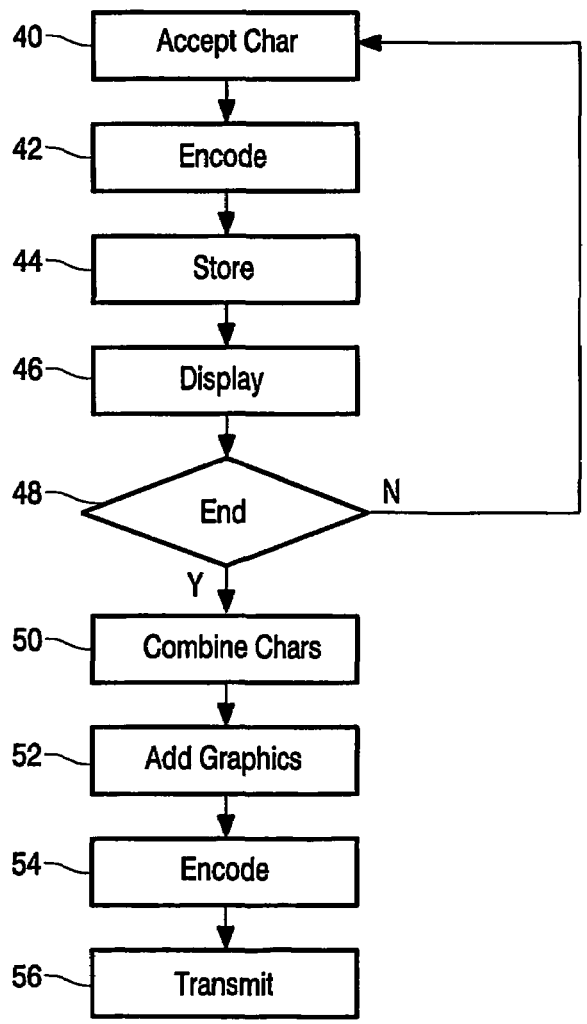
FIG. 2 is a flow diagram showing the operation of the mobile device of FIG. 1.

Referring to FIG. 2, in use the user enters text by entering at least one stroke using either a finger or a pen 30 on the touch sensitive screen 14. The device accepts 40 the entered strokes.

For example, if the user were to enter an "A" character, the device would store three strokes, the first being from the bottom left corner to the top middle, the second being from the top middle to the bottom right corner and then a horizontal line in the middle of the display. The format of the recorded strokes may vary depending on the application. Features such as the start and end point of the line, the curvature of the line, and the jaggedness may also be stored.

After each character is input it is encoded 42 in a suitable vector graphics format which allows it to be resized easily.

The character is stored 44 in memory 20. By default it may be automatically shrunk and displayed 46 on the touch screen 14, placed to the right of the previous character as for normal text input. This enables a text message to be built up from a number of strokes.

The text message is displayed as a sequence of characters of substantially equal size even though the characters are stored as scaler vector graphics objects and not as characters themselves.

The device then accepts 48 a user input to signify a complete vector graphics message. One overall vector graphic is then created 50 from the individual components. This operation is trivial in most common vector graphics languages.

The user is then allowed the option of adding 52 general vector graphics components to the whole message, for example by underlining phrases, or by drawing an image over the whole message and similar. For example, the user may draw a heart over the whole message.

Figure 3:
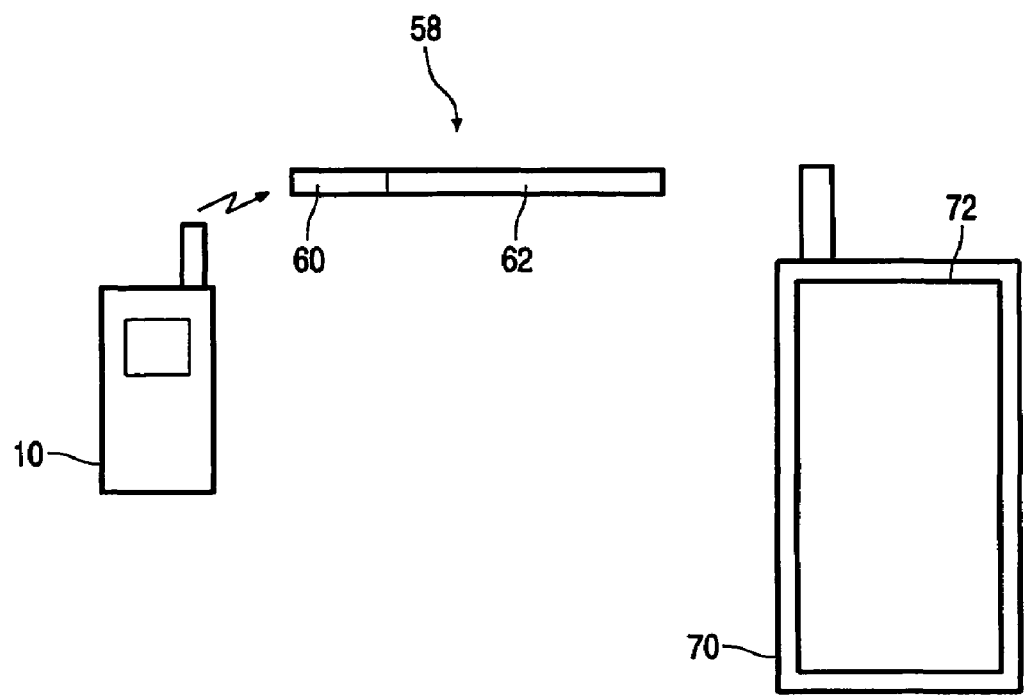
FIG. 3 shows transmission of a message.

The message 58 is then encoded 54 into an encoding format suitable for the transport used, and transmitted 56. The information transmitted includes a header 60 and a vector graphics message 62 (FIG. 3).

The message may be received and displayed on the display 72 of a receiving mobile terminal 70. Because of the nature of vector graphics, resizing to suit the size of the new display is easy and does not require excessive processing power in spite of the use of graphic characters rather than conventional characters.

Figure 4:
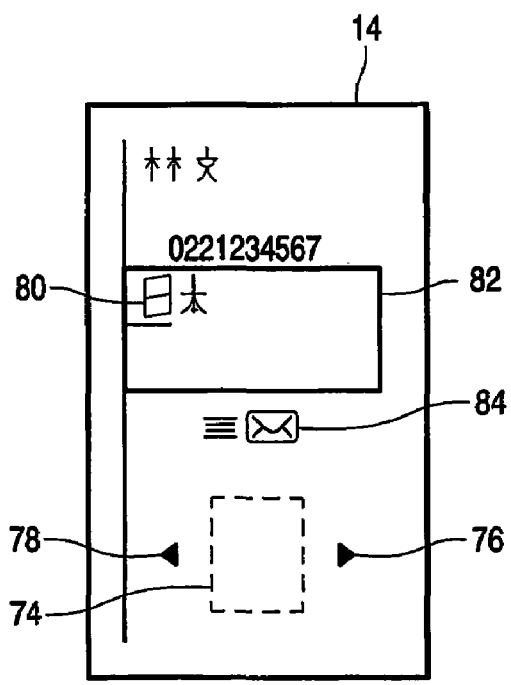
FIG. 4 shows a sample display as the user enters text on a mobile device in accordance with FIG. 1.

FIG. 4 illustrates a possible screen display. The user enters each character consecutively in the dotted rectangle 74 using the stylus 30. The user may press the arrow on the right 76 to insert a space, or the arrow on the left 78 to delete the previous character. After each entry, each character 80 appears separately in the central box 82, and when the complete message is finished, pressing the envelope icon 84 sends the message. A sound may be provided to indicate whether or not this is successful. No attempt is made to recognise the character entered. Instead, the graphics are stored as vector graphics and sent in this format to the addressee.

The invention is applicable to any electronic device, especially a mobile device, such as a mobile telephone, PDA, communication system or for note taking etc.

Although the method disclosed above avoids the need for character recognition, this may be carried out if required either in the transmitter or the receiver in order to carry out other functions or tasks that require interpretation of the input characters.

The terms "character" and "text" are not limited to language characters. They may include emotions, faces, graphic symbols and the like.

The skilled person will appreciate that the precise order of character entry described above may be varied. For example, individual graphics may be entered at any time, rather than the end of the message, or the entered characters may be displayed in other ways.

In the described embodiment the code 26 is stored in memory 20 acting as a data carrier. The skilled person will be aware of many suitable data carriers for code, including floppy, hard and optical discs, CDs, DVDs, flash memory cards, and many more.

From reading the present disclosure, other variations and modifications will be apparent to persons skilled in the art. Such variations and modifications may involve equivalent and other features which are already known in the design, manufacture and use of text input devices and which may be used in addition to or instead of features described herein. Although claims have been formulated in this application to particular combinations of features, it should be understood that the scope of disclosure also includes any novel feature or any novel combination of features disclosed herein either explicitly or implicitly or any generalisation thereof, whether or not it mitigates any or all of the same technical problems as does the present invention. The applicants hereby give notice that new claims may be formulated to any such features and/or combinations of such features during the prosecution of the present application or of any further applications derived therefrom.

The invention claimed is:

1. An electronic device, comprising;
   a touch sensitive surface for inputting strokes forming at least one character;
   a memory; and
   code for interpreting the strokes and storing the strokes in the memory in a vector graphics format;
   wherein the code stores the strokes representing the at least one character in the memory without carrying out character recognition on the at least one character.

2. An electronic device according to claim 1 further comprising an aerial and code for causing the electronic device to combine strokes representing a plurality of characters and to transmit the combined strokes as a message via the aerial over a mobile network.

3. An electronic device according to claim 1 wherein the vector graphics format is the scalable vector graphics format.

4. An input method for an electronic device, including the acts of:
   accepting on a touch sensitive surface at least one stroke forming at least one character;
   encoding the at least one stroke entered in a vector graphics format to form encoded strokes; and
   storing the encoded strokes;
   wherein the at least one stroke is recorded in a memory without carrying out character recognition on the at least one character.

5. A method according to claim 4 further comprising combining the stored encoded strokes to make up a complete message in the vector graphics format;
   encoding the complete message for transmission; and
   transmitting the complete message over a mobile telephone network.

6. A method according to claim 4 wherein the vector graphics format is the scalable vector graphics format.

7. A computer program product containing code for causing an electronic device to carry out the acts of the method according to claim 4.

8. A computer program product recorded on a data carrier containing code for causing a mobile device to carry out the acts of:
   accepting on a touch sensitive surface at least one stroke of text made up of at least one character;
   encoding the at least one stroke entered in a vector graphics format to form encoded strokes; and
   storing the encoded strokes;
   wherein the at least one stroke is recorded in a memory without carrying out character recognition on the at least one character.

* * * * *